United States Patent [19]
Hendriks

[11] Patent Number: 6,151,174
[45] Date of Patent: Nov. 21, 2000

[54] DEVICE FOR OPTICALLY SCANNING A RECORD CARRIER

[75] Inventor: Bernardus H. W. Hendriks, Eindhoven, Netherlands

[73] Assignee: U.S. Philips Corporation, New York, N.Y.

[21] Appl. No.: 09/137,369

[22] Filed: Aug. 20, 1998

[30] Foreign Application Priority Data

Oct. 6, 1997 [EP] European Pat. Off. .............. 97203060

[51] Int. Cl.⁷ ................................ G02B 7/02; G11B 3/90
[52] U.S. Cl. ............................ 359/821; 359/822; 369/58
[58] Field of Search .................................. 359/641, 813, 359/814, 822, 823, 824; 369/58

[56] References Cited

U.S. PATENT DOCUMENTS

| | | | |
|---|---|---|---|
| 5,302,834 | 4/1994 | Murao | 250/561 |
| 5,553,052 | 9/1996 | Oono et al. | 369/112 |
| 5,623,466 | 4/1997 | Itonaga | 369/44.32 |
| 5,768,027 | 6/1998 | Takahashi | 359/637 |
| 5,768,232 | 6/1998 | Muramasatsu et al. | 369/54 |
| 5,774,281 | 6/1998 | Meada et al. | 359/822 |
| 5,859,818 | 10/1999 | Tateishi et al. | 369/44.32 |
| 5,886,496 | 3/1999 | Furukawa et al. | 318/648 |
| 5,970,035 | 10/1999 | Ohmori et al. | 369/54 |

FOREIGN PATENT DOCUMENTS

| | | | |
|---|---|---|---|
| 0727777A1 | 8/1996 | European Pat. Off. | G11B 7/12 |
| 2675297 | 10/1992 | France | G11B 7/12 |
| 08315404 | 11/1996 | Japan | G11B 7/135 |
| 08315404A | 11/1996 | Japan | G11B 7/135 |

*Primary Examiner*—Georgia Epps
*Assistant Examiner*—David Sekrafi
*Attorney, Agent, or Firm*—Leroy Eason

[57] ABSTRACT

A scanning device for an optical record carrier (1) comprises a high-numerical aperture dual lens objective system (10, 11) for focussing a radiation beam (7) on an information layer (3) of the record carrier. The lens (11) of the objective system closest to the record carrier is tilted by a tilt servo system in response to tilt of the record carrier. The tilt angle of the lens is preferably less than the tilt angle of the record carrier in order to reduce optical aberrations of the radiation beam such as coma and astigmatism.

5 Claims, 4 Drawing Sheets

DEVICE FOR OPTICALLY SCANNING A RECORD CARRIER

BACKGROUND OF THE INVENTION

1. Field of the Invention

The invention relates to an optical scanning device for scanning an optical disc record carrier having an information plane and an adjoining layer, the device comprising an objective lens system having a first lens and a second lens, the second lens being arranged between the first lens and the record carrier, for converging a radiation beam through the transparent layer to a focus spot on the information layer.

The dual-lens objective system focusses the radiation beam at a relatively high numerical aperture through an entrance face of the transparent layer. The high numerical aperture causes a small focus spot and allows writing and reading of very high density information on the record carrier. The second lens of the objective system, which is closest to the record carrier, has in general a convex surface facing the first lens and a substantially flat surface facing the record carrier. A focus servo system keeps the focus spot on the information layer during scanning.

2. Description of the Related Art

The optical scanning device disclosed in Japanese patent application no. 8-315404 A uses the focus servo system to control the axial position of the first lens and a further servo system to control the axial position of the second lens. A disadvantage of that device is that its tolerance for tilt of the record carrier decreases rapidly when the thickness of the transparent layer increased.

SUMMARY OF THE INVENTION

It is an object of the invention to provide a scanning device which has a greater tolerance for disc tilt.

This object is achieved, according to the invention, by a scanning device which comprises the servo system for controlling a tilt angle of the second lens with respect to the optical axis of the objective lens in dependence on the tilt angle $\beta$ of the transparent layer. The tilt angle $\alpha$ thereof is the angle between the optical axis of the second lens and the optical axis of the first lens. The servo system makes it possible to tilt the second lens in response to tilt of the record carrier for all sizes of air gap between the second lens and the record carrier, thereby reducing optical aberrations in the device and increasing the tolerance for tilt of the record carrier. The invention allows the use of relatively large air gaps and thick transparent layers, making it also tolerant of contamination of the record carrier.

In a preferred embodiment of the scanning device according to the invention the tilt angle $\alpha$ of the second lens is smaller than the tilt angle $\beta$ of the transparent layer. This measure further reduces the aberrations caused in the radiation beam due to tilt of the record carrier. The coma introduced by the now wedge-shaped gap between the second lens and the record carrier compensates coma introduced in the radiation beam in passing through the tilted transparent layer of the record carrier.

It is remarked that the scanning device disclosed in European patent no. 0 727 777 reduces the effect of tilt of the record carrier on the focus spot by mounting the second lens of the objective system on an air bearing that follows the entrance face of the record carrier. The second lens is thereby given the same tilt as the record carrier. However, the air bearing cannot be used for air gaps larger than several tens of micrometers. Moreover, the tilt tolerance for such large air gaps is relatively small.

In a preferred embodiment of the scanning device according to the invention the tilt servo system keeps the angle $\alpha$ at a constant fraction of the angle $\beta$. The constant fraction or constant of proportionality lies preferably in the range from 0.02 to 0.98 for contamination tolerant scanning devices. The constant lies preferably in the range from 0.2 to 0.95 for a significant increase of the tilt tolerance.

The constant fraction is preferably set in dependence on the air gap distance $d_2$ between the second lens and the record carrier and on the thickness $d_3$ of the transparent layer.

In a special embodiment of the air gap scanning device according to the invention the distance $d_2$ between the second lens and the record carrier and the thickness $d_3$ of the transparent layer are chosen such that the coma and astigmatism of the radiation beam are substantially minimized, independent of the tilt angle $\beta$.

BRIEF DESCRIPTION OF THE DRAWINGS

The objects, advantages and features of the invention will be apparent from the following more particular description of preferred embodiments of the invention, as illustrated in the accompanying drawings, wherein.

DESCRIPTION OF THE PREFERRED EMBODIMENTS

Figure 1:
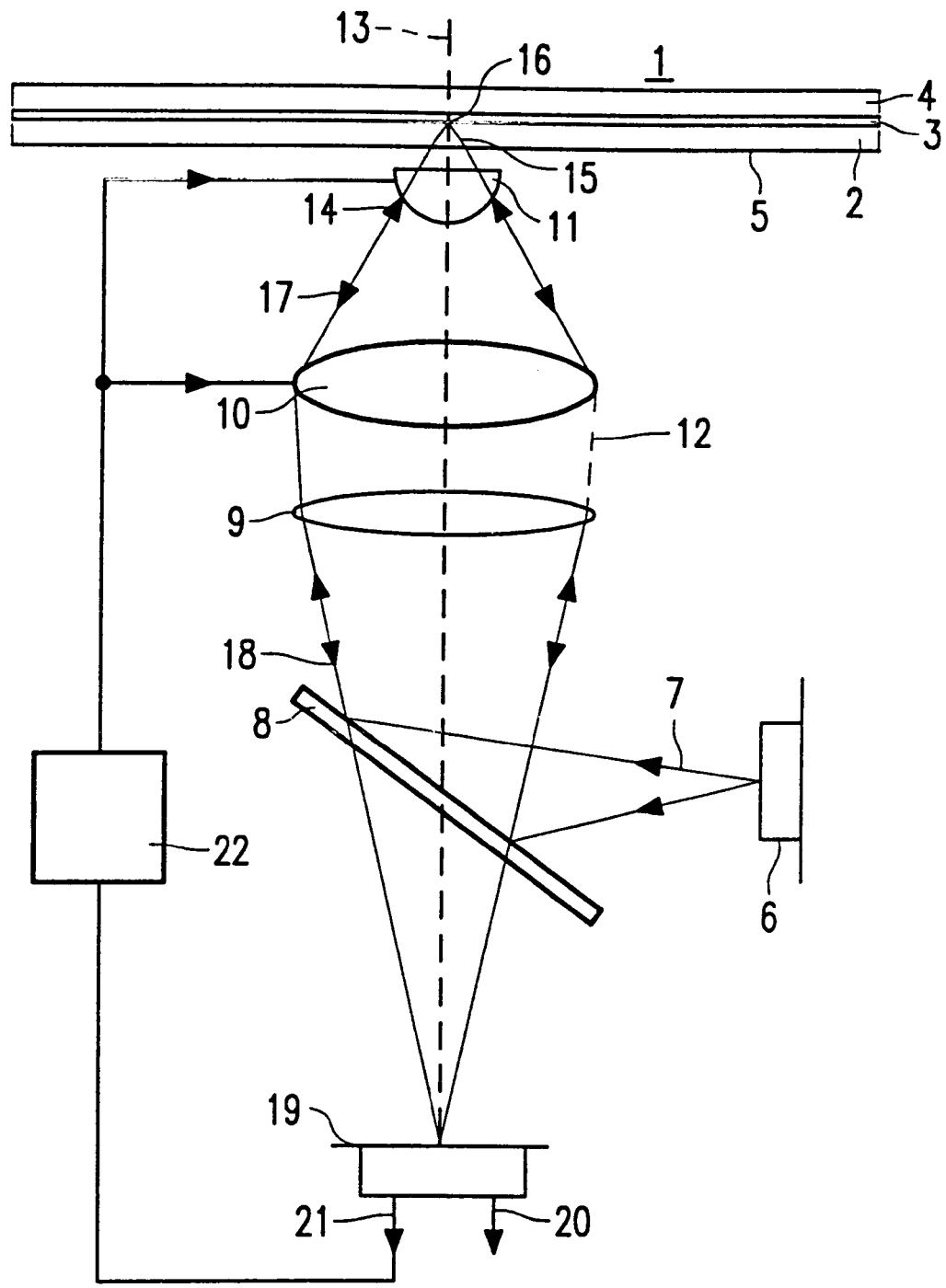
FIG. 1 shows a scanning device and record carrier.

FIG. 1 shows a device for scanning an optical record carrier 1. The record carrier comprises a transparent layer 2, on one side of which an information layer 3 is arranged. The side of the information layer facing away from the transparent layer is protected from environmental influences by a protection layer 4. The side of the transparent layer facing the device is called the entrance face 5. The transparent layer 2 acts as a substrate for the record carrier by providing mechanical support for the information layer. Alternatively, the transparent layer may have the sole function of protecting the information layer, while the mechanical support is provided by a layer on the other side of the information layer, for instance by the protection layer 4 or by a further information layer and transparent layer connected to the information layer 3. Information may be stored in the information layer 3 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetization different from their surroundings, or a combination of these forms.

The scanning device comprises a radiation source 6, for example a semi-conductor laser, emitting a diverging radiation beam 7. A beam splitter 8, for example a semi-transparent plate, reflects the radiation towards a lens system. The lens system comprises a collimator lens 9, and an objective system comprising a first lens 10 and a second lens 11. Collimator lens 9 changes the diverging radiation beam 7 to a collimated beam 12. First lens 10, having an optical axis 13, transforms collimated radiation beam 12 into a converging beam 14 incident on lens 11. Collimator lens 9 and first lens 10 may be combined into a single lens. Second lens 11 changes incident beam 14 into a converging beam 15, which comes to a focus spot 16 on information layer 3. Second lens 11 in the embodiment of the Figure is a plano-convex lens. Its planar surface faces transparent layer 2 and forms a gap between the lens and the layer. The planar surface may have an aspherical profile to compensate for optical aberrations. Although objective lens 10 is indicated in the Figure as a single lens element, it may comprise more elements, and may also comprise a hologram operating in transmission or reflection, or a grating for coupling radiation out of a waveguide carrying the radiation beam. Radiation of converging beam 15 reflected by information layer 3 forms a reflected beam 17, which returns on the optical path of forward converging beam 14. First lens 10 and collimator lens 9 transform reflected beam 17 to a converging reflected beam 18, and beam splitter 8 separates the forward and reflected beams by transmitting at least part of reflected beam 18 towards a detection system 19. The detection system captures the radiation and converts it into one or more electrical signals. One of these signals is an information signal 20, the value of which represents the information read from the information layer 3. Another signal is a focus error signal 21, the value of which represents the axial difference in height between focus spot 16 and information layer 3. The focus error signal is used as input for a focus servo controller 22, which controls the axial position of first lens 10 and/or second lens 11, thereby controlling the axial position of focus 16 spot such that it coincides substantially with the plane of information layer 3.

Beam splitter 8 may also be a grating, which passes in transmission radiation beam 7 from radiation source 6, and deflects part of reflected beam 18 towards detection system 19. In that case radiation source 6 and detection system 19 may be arranged close together on one side of the grating.

Figure 2:
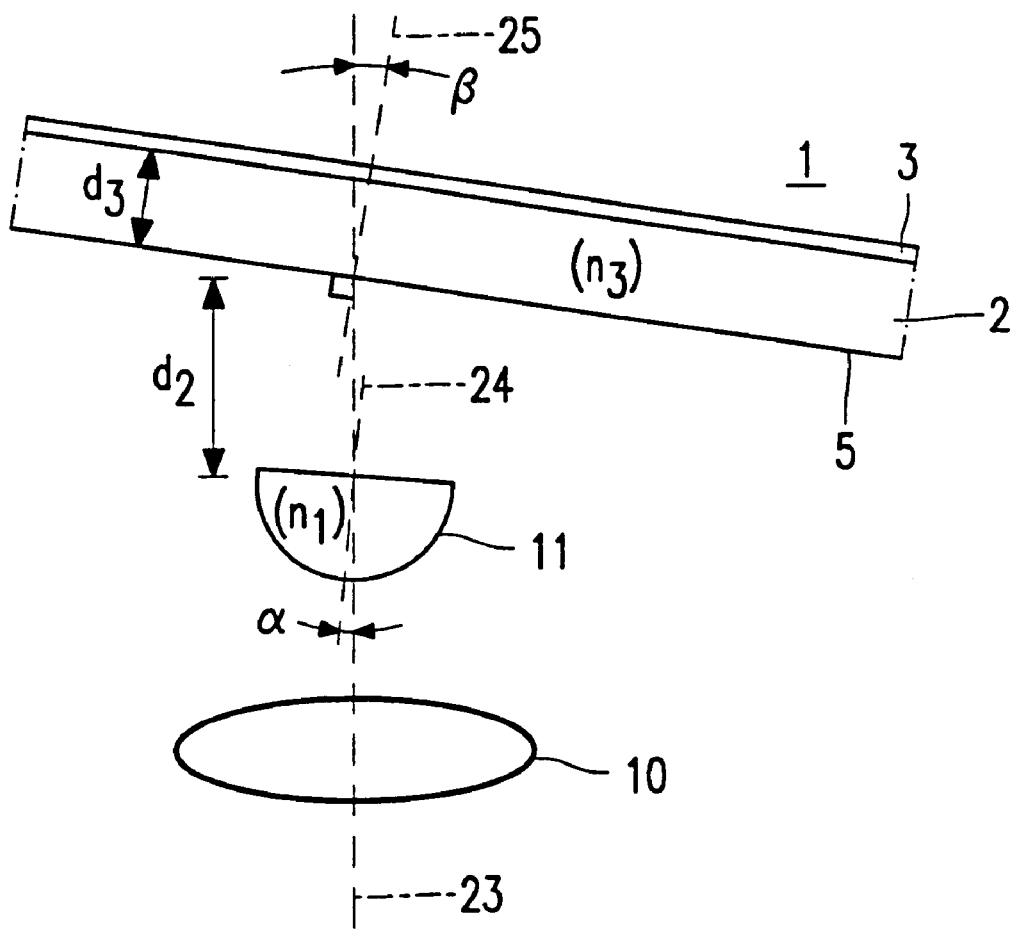
FIG. 2 is an enlargement of the objective system and record carrier of FIG. 1.

FIG. 2 shows an enlargement of the objective system and part of record carrier 1. The optical axis of first lens 10 is indicated by dashed line 23. Optical axis 24 of second lens 11 is inclined at an angle $\alpha$ with respect to optical axis 23. Record carrier 1 is also tilted, and the normal 25 on its entrance surface 5 makes an angle $\beta$ with optical axis 23. When the record carrier shows at a certain instant a tilt angle $\beta$, second lens 11 preferably follows the record carrier in tilting over an angle $\alpha=c\beta$ in order to reduce coma, where $\alpha$ and $\beta$ substantially comply with $$\alpha = \frac{1}{1 - n_1 + \left(1 + \frac{n_3 d_2}{d_3}\right)\frac{n_3^2}{n_1}\left(\frac{n_1^2 - 1}{n_3^2 - 1}\right)}\beta, \quad (1)$$

where $n_1$ and $n_3$ are the refractive indices of the material of second lens 11 and transparent layer 2, $d_2$ is the thickness of the air gap between second lens 11 and transparent layer 2, and $d_3$ is the thickness of transparent layer 2. The thickness of the air gap is measured along optical axis 23. When the refractive indices $n_1$ and $n_3$ are equal, the relation between the angles $\alpha$ and $\beta$ is $$\alpha = \frac{1}{1 + \frac{d_2 n_3^2}{d_3}}\beta \quad (2)$$

Figure 3A:
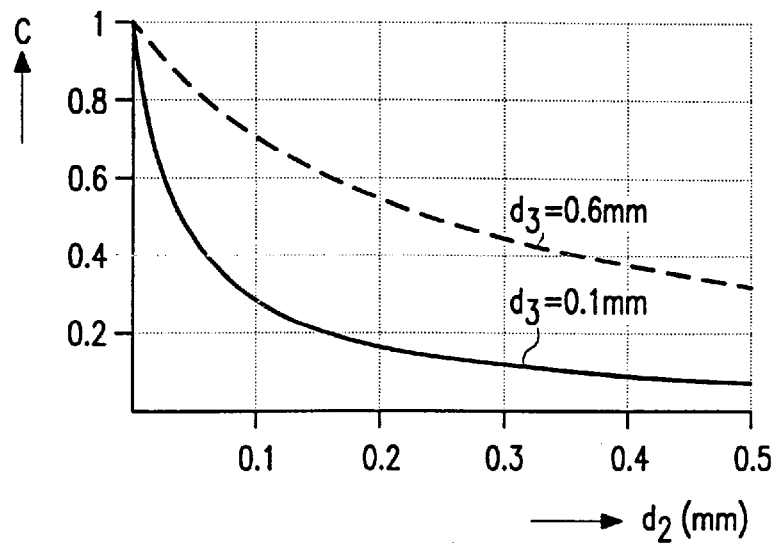
FIG. 3a is a graphical representation of the dependence of the constant c of the air gap and transparent layer thickness.

FIG. 3a shows the constant of proportionality c between $\alpha$ and $\beta$ according to equation 2 as a function of the gap thickness $d_2$ for a refractive index $n_3$ of the transparent layer equal to 1.58 and a thickness $d_3$ of the transparent layer equal to 0.6 mm (dashed line) and 0.1 mm (solid line). The constant c is equal to the fraction on the right hand side of equation (2). The Figure shows that for increasing air gap and for decreasing thickness of the transparent layer the value of c, which is the ratio of angle $\alpha$ over $\beta$ is decreased. Equations 1 and 2 have been derived using only the lowest order aberrations. The accuracy of value of c in the equations is ±0.15.

TABLE I

| $d_2/d_3$ | NA = 0.85<br>$n_3$ = 1.45 | NA = 0.85<br>$n_3$ = 1.58 | NA = 0.85<br>$n_3$ = 1.80 | NA = 0.60<br>$n_3$ = 1.58 |
|---|---|---|---|---|
| 0.1 | 0.84 | 0.71 | 0.58 | 0.78 |
| 0.2 | 0.66 | 0.55 | 0.45 | 0.63 |
| 0.3 | 0.54 | 0.45 | 0.36 | 0.53 |
| 0.4 | 0.46 | 0.38 | 0.31 | 0.46 |
| 0.5 | 0.40 | 0.33 | 0.26 | 0.40 |
| 0.6 | 0.35 | 0.29 | 0.23 | 0.36 |
| 0.7 | 0.31 | 0.26 | 0.21 | 0.33 |
| 0.8 | 0.28 | 0.24 | 0.19 | 0.30 |
| 0.9 | 0.26 | 0.21 | 0.17 | 0.27 |
| 1.0 | 0.24 | 0.20 | 0.16 | 0.25 |

Table I provides more accurate values of c, because they have been calculated using higher order aberrations. The second lens has been tilted around the centre of curvature of the surface of the second lens that faces the first lens. The values have been determined by ray tracing for the case where $n_3$=1.58 and have an accuracy of ±0.02.

Figure 3B:
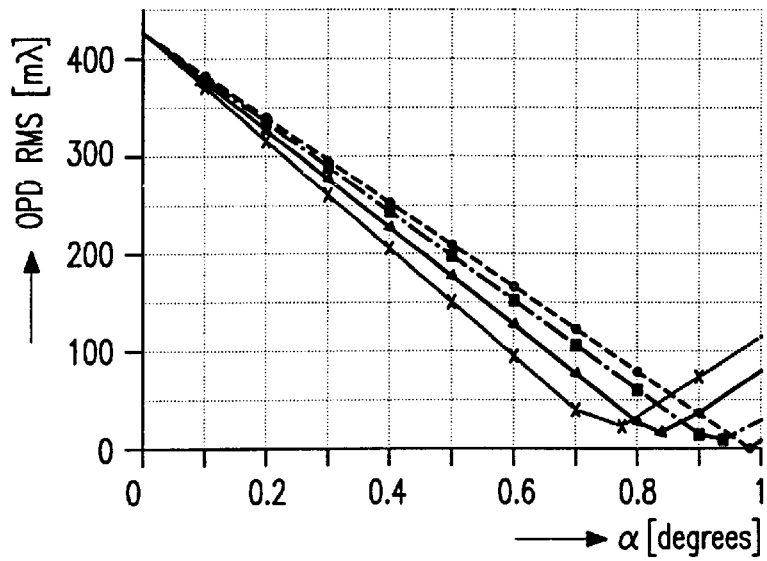
FIG. 3b shows the wavefront error for different tilt conditions.

FIG. 3b shows the RMS wavefront error at focal spot 16 as a function of tilt angle $\alpha$ for a record carrier tilt $\beta$ of 1°, a 0.6 mm thickness transparent layer 2 and four different gap sizes: 2 $\mu$m (line with circles), 25 $\mu$m (line with squares), 50 $\mu$m (line with triangles) and 75 $\mu$m (line with crosses). The refractive index $n_1$ of the second lens has been optimized and has the value of 1.571, 1.499, 1.486 and 1.457 for the case of a gap size of 2, 25, 50 and 75 $\mu$m respectively. The transparent layer is made of polycarbonate with a refractive index $n_3$ of 1.58 and a thickness $d_3$ of 0.6 mm. If second lens 11 follows the tilt of the record carrier, i.e. $\alpha=\beta$, as is done in the known scanning devices, the Figure shows at $\alpha=1°$ that for a gap of 50 $\mu$m the wavefront aberration is 85 m$\lambda$. A scanning device that does not tilt the second lens, i.e. $\alpha=0$, has a wavefront aberration of 430 m$\lambda$ for a gap of 50 $\mu$m. This is not tolerable for most scanning devices. The device according to the invention adjusts $\alpha$ to 0.83° when $\beta=1°$. In that case the rest aberration is 14 m$\lambda$. This is more than a factor of six lower than the 85 m$\lambda$ of the known scanning device that follows the tilt angle of the record carrier and a factor of 30 lower than the 430 m$\lambda$ of the known device in which the second lens does not follow the tilt angle of the record carrier. In this case the tilt angle $\alpha$ of second lens 11 should, according to the invention, follow the tilt angle $\beta$ of the record carrier, keeping $\alpha$ substantially equal to 0.83 $\beta$. The rest aberration of 14 m$\lambda$ is caused by higher order coma.

Equations (1) and (2) reduce coma in the radiation beam. It is also possible to reduce astigmatism instead. In that case the relation between $\alpha$ and $\beta$ becomes $$\alpha = \frac{1}{1 - n_1 + \left(\left(1 + \frac{n_3 d_2}{d_3}\right) n_3^2 \left(\frac{n_1^2 - 1}{n_3^2 - 1}\right)\right)^{\frac{1}{2}}} \beta \quad (3)$$

When $n_1$ is equal to $n_3$ $$\alpha = \frac{1}{1 - n_3 + \left(1 + \frac{d_2 n_3}{d_3}\right)^{\frac{1}{2}} n_3} \beta \quad (4)$$

The coma and astigmatism are both minimized when the gap $d_2$ and transparent layer thickness $d_3$ substantially comply with $$\frac{d_2}{d_3} = \frac{1}{n_3} \left[ \frac{n_1^2}{n_3^2} \left( \frac{n_3^2 - 1}{n_1^2 - 1} \right) - 1 \right] \quad (5)$$

Equations 3, 4 and 5 have been derived using only the lowest order aberrations.

Figure 4:
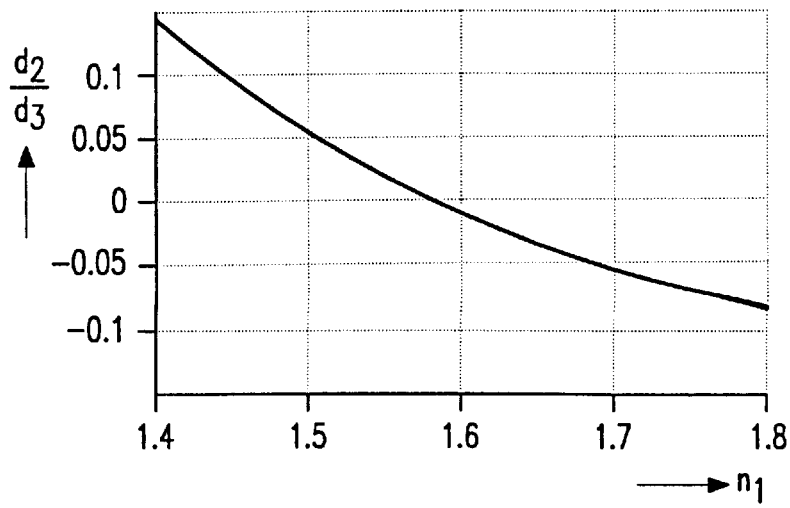
FIG. 4 is a graphical representation of a thickness ratio for which both coma and astigmatism are minimized.

FIG. 4 shows the ratio of $d_2$ over $d_3$ of equation 5 for $n_3$ equal to 1.58 (polycarbonate). It shows that the refractive index $n_1$ of second lens 11 must be smaller than the refractive index $n_3$ of transparent layer 2 to achieve minimum coma and astigmatism and a positive value of the ratio $d_2$ over $d_3$. If, as an example, $n_1=1.50$ and $n_3=1.58$, then the gap $d_2=0.05 \, d_3$, and so a gap of 25 μm should be used when the transparent layer has a thickness insert $d_3$ of 0.5 mm.

When a record carrier can show tilt in two perpendicular directions, there will be two values of tilt angle β in the two perpendicular directions and two corresponding tilt angles α. The above considerations apply to both directions. The relation between α and β may be the same for both directions, but they may also be different, e.g. to obtain minimum coma for tilt in one direction and minimum astigmatism for tilt in the perpendicular direction.

Figure 5:
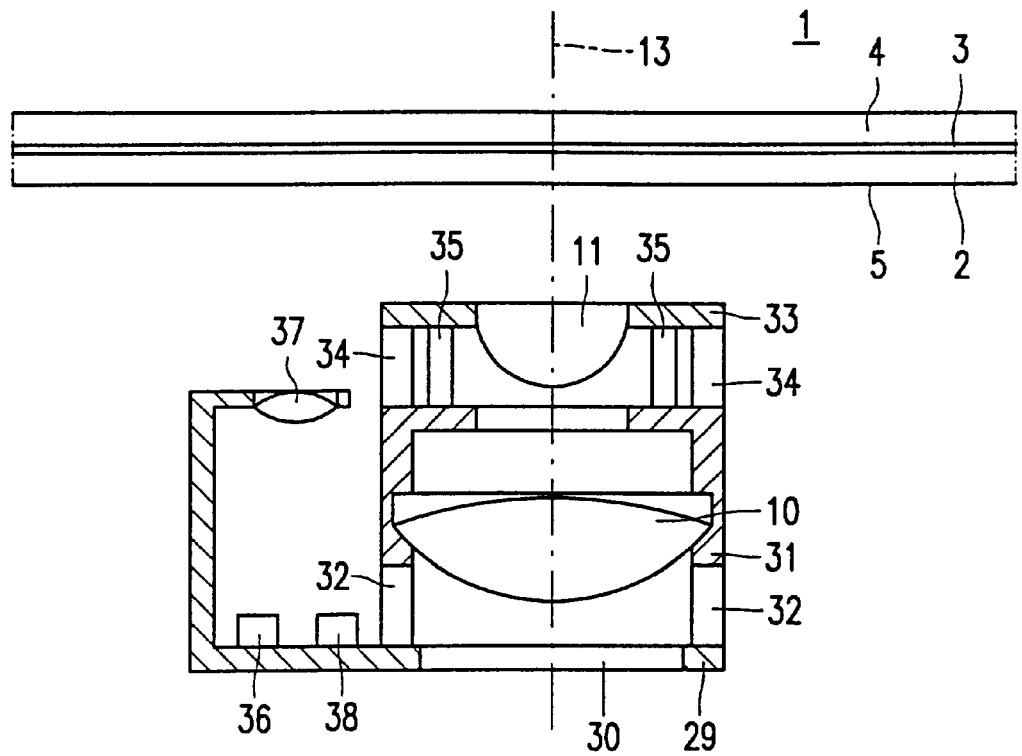
FIG. 5 is a schematic drawing of the construction of the objective system.

FIG. 5 shows in a schematic drawing the construction of the objective system with lenses 10 and 11. The construction is mounted on a base plate 29 provided with a hole for passing radiation beam 12. Lens 10 is mounted in a holder 31 connected to baseplate 29 by a focus actuator 32 for moving lens 10 along its optical axis 13. The focus actuator may comprise one or more piezo actuators or a linear electromagnetic motor having a spring suspension of holder 31. Focus actuator 32 may also have the ability to move holder in a direction perpendicular to optical axis 13 in order to move focus spot 16 in a direction perpendicular to the optical axis for following tracks on record carrier 1. Focus actuator 32 is controlled by focus servo controller 22.

Lens 11 is mounted in a holder 33 connected to holder 31 by a tilt actuator 34 for tilting holder 33 in two perpendicular directions. Actuator 34 may comprise three piezo actuators arranged at 120° intervals along a circle or three linear electromagnetic motors having spring suspensions of holder 33. Three distance sensors 35 are mounted between holders 31 and 34. The output signals of the sensors allow the generation of signals representing the distance between lenses 10 and 11 and the tilt of lens 11 with respect to optical axis 13 in two perpendicular directions. The distance sensors may be of any type, e.g. capacitive or inductive. Actuator 34 may also be able to move lens 11 with respect to lens 10 along optical axis 13, controlled by a signal representing the spherical aberration present in reflected beam 18.

A tilt sensor comprising a radiation source 36, a lens 37 having a relatively low numerical aperture and a quadrant detector 38. Lens 37 converges radiation from source 36 to a parallel beam towards record carrier 1 and radiation reflected from the record carrier is converged to a spot on detector 38. A tilt of the record carrier with respect to base plate 29 can be measured by determining the position of the spot on detector 38.

Figure 6:
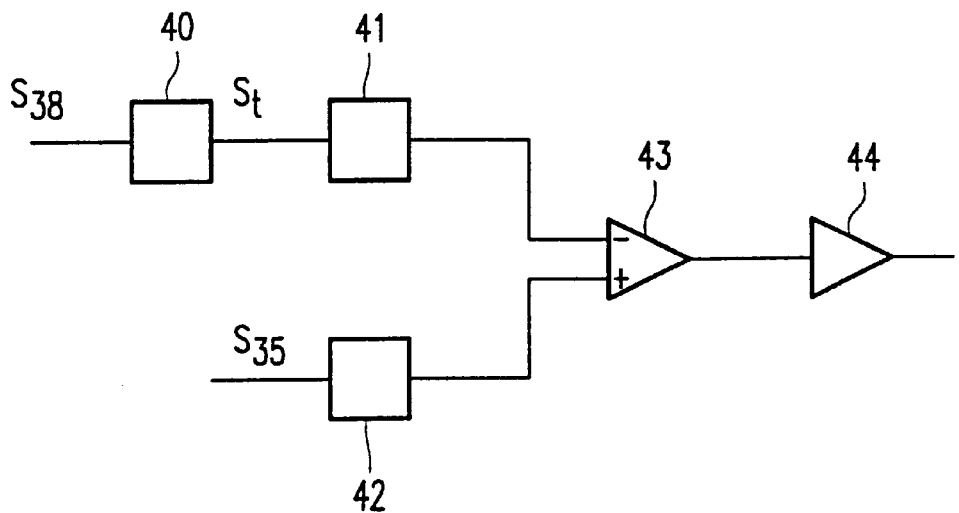
FIG. 6 shows a tilt servo system.

FIG. 6 shows an embodiment of a tilt servo system of the scanning device according to the invention. A signal processor 40 processes one or more output signals $S_{38}$ from tilt detector 38 to form two tilt signals $S_{t1}$ and $S_{t2}$, the values of which represent the tilt angle $\beta_1$ and $\beta_2$ of record carrier 1 in two perpendicular directions. A circuit 41 multiplies the values of $\beta_1$ and $\beta_2$ by the constant of proportionality as given by equation 1, 2, 3 or 4, table I or obtained by ray tracing to supply as output signal two values of the desired tilt angle $\alpha_1$ and $\alpha_2$ of lens 11. Output signals $S_{35}$ of distance sensors 35 are processed in a signal processor 42 to two tilt signals, the values of which represent the actual tilt angle of lens 11 in two perpendicular directions. A difference amplifier subtracts the output signals of circuit 41 representing the desired tilt angles from the corresponding output signals of processing circuit 42 representing the actual tilt angles. The output signals of the difference amplifier for the two perpendicular directions are supplied to a driver 44, which controls the motion of actuators 34.

What is claimed is:

1. An optical device for scanning an optical record carrier having an information plane and a transparent layer, said scanning device comprising:

an objective system having a first lens, a second lens and an optical axis;

the second lens being arranged between the first lens and the record carrier for converging a radiation beam which passes through the transparent layer into a focus spot on the information layer; and a servo system for controlling a tilt angle α of the second lens with respect to said optical axis to remain a constant proportion of a tilt angle β of the transparent layer with respect to said optical axis.

2. Optical scanning device according to claim 1, wherein the tilt angle α of the second lens is controlled to remain a constant fractional proportion of the tilt angle β of the transparent layer.

3. Optical scanning device according to claim 2, wherein the constant of such proportionality is independent of α and β.

4. Optical scanning device according to claim 3, wherein the constant of proportionality depends on the spacing between the second lens and the record carrier and also on the thickness of the transparent layer.

5. Optical scanning device according to claim 2, wherein the spacing $d_2$ between the second lens and the record carrier and the thickness $d_3$ of the transparent layer are such as to minimize coma and astigmatism of the radiation beam, and are independent of the tilt angle β of the transparent layer.

* * * * *